(12) United States Patent
Senior et al.

(10) Patent No.: US 12,645,459 B2
(45) Date of Patent: Jun. 2, 2026

(54) REDUCTION OF DATA TRANSFER OVERHEAD

(71) Applicant: QUALCOMM Incorporated, San Diego, CA (US)

(72) Inventors: Richard Senior, San Diego, CA (US); Venkatarami Mora, Cedar Park, TX (US); Suresh Kumar Venkumahanti, Austin, TX (US); Avinash Gadde, San Diego, CA (US); Christopher Ahn, San Diego, CA (US); Sangchol Lee, San Diego, CA (US); Sanjana Rajeev, San Diego, CA (US); Dhairya Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 18/510,088

(22) Filed: Nov. 15, 2023

(65) Prior Publication Data

US 2025/0156187 A1 May 15, 2025

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3861* (2013.01)

(58) Field of Classification Search
CPC ... G06F 9/3806; G06F 9/3861; G06F 9/30058
See application file for complete search history.

(56) References Cited

U.S. PATENT DOCUMENTS

| | | | | |
|---|---|---|---|---|
| 8,756,582 | B2 | 6/2014 | Serrano | |
| 2008/0155353 | A1 | 6/2008 | Craske | |
| 2014/0337604 | A1* | 11/2014 | Strong | G06F 9/30145 712/205 |
| 2019/0005231 | A1* | 1/2019 | Peleg | G06F 21/54 |
| 2019/0102550 | A1* | 4/2019 | Zhang | G06F 9/30054 |
| 2020/0026519 | A1* | 1/2020 | Sultana | G06F 9/30058 |
| 2020/0371891 | A1* | 11/2020 | Horley | G06F 11/0754 |

FOREIGN PATENT DOCUMENTS

EP 0069525 B1 4/1986

OTHER PUBLICATIONS

International Search Report and Written Opinion—PCT/US2024/051428—ISA/EPO—May 23, 2025.
Partial International Search Report—PCT/US2024/051428—ISA/EPO—Feb. 10, 2025.

* cited by examiner

*Primary Examiner* — Michael J Metzger
(74) *Attorney, Agent, or Firm* — Loza & Loza LLP

(57) ABSTRACT

Aspects of the disclosure are directed to reduction of data transfer overhead. In accordance with one aspect, increment a function call counter for an executed function call; decrement the function call counter for an executed return from function call; infer the indirect branch address based on a function call counter value and when a cumulative count of received executed atoms indicates a return from function call has been executed; oversaturate the function call counter at a maximum counter value if the function call counter contains the maximum counter value and a subsequent function call is executed; and undersaturate the function call counter at a minimum counter value if the function call counter contains the minimum counter value and a subsequent return from function call is executed.

30 Claims, 8 Drawing Sheets

300

| 310 | 320 | 330 | 340 | 350 | 360 |
|---|---|---|---|---|---|
| VA | | Cnt 2bit | Return Type | Atom | Branch Address |
| 0x100 (311) | call foo (321) | 0->1 (331) | | E (351) | (361) |
| 0x200 (312) | call bar (322) | 1->2 (332) | | E (352) | (362) |
| 0x300 (313) | call foobar (323) | 2->3 (333) | | E (353) | (363) |
| | jumpr r31 (324) | 3->2 (334) | Implicit (344) | E (354) | 0x304 (364) |
| | jumpr r31 (325) | 2->1 (335) | Implicit (345) | E (355) | 0x204 (365) |
| | jumpr r31 (326) | 1->0 (336) | Implicit (346) | E (356) | 0x104 (366) |

| 510 | 520 | 530 | 540 | 550 | 560 |
|---|---|---|---|---|---|
| VA | | Cnt 2bit | Return Type | Atom | Branch Address |
| 0x100 (511) | call foo (521) | 0->1 (531) | | E (551) | |
| 0x200 (512) | call bar (522) | 1->2 (532) | | E (552) | |
| 0x300 (513) | call foobar (523) | 2->3 (533) | | E (553) | |
| 0x400 (514) | call foofoobar (524) | 3->3 (534) | | E (554) | |
| 0x500 (515) | call foofoofoobar (525) | 3->3 (535) | | E (555) | |
| | jumpr r31 (526) | 3->2 (536) | Implicit (546) | E (556) | 0x504 (566) |
| | jumpr r31 (527) | 2->1 (537) | Implicit (547) | E (557) | 0x404 (567) |
| | jumpr r31 (528) | 1->0 (538) | Implicit (548) | E (558) | 0x304 (568) |
| | jumpr r31 (529) | 0->0 (539) | Explicit (549) | E (559) | 0x204 (569) |
| | jumpr r31 (529a) | 0->0 (539a) | Explicit (549a) | E (559a) | 0x104 (569a) |

FIG. 5

| Scenario | ETM Detection | Action |
|---|---|---|
| Context Switch (611) | trap/rte (621) | Set counter to 0 (631) |
| Overflow (612) | GSYNC overflow (622) | Set counter to 0 (632) |
| SW Manipulation (613) | N/A (623) | Decoder can handle (633) |

REDUCTION OF DATA TRANSFER OVERHEAD

TECHNICAL FIELD

This disclosure relates generally to the field of information processing systems, and, in particular, to reduction of data transfer overhead.

BACKGROUND

Information processing systems may include multiple processing engines, processors or processing cores for a variety of user applications. An information processing system may include a central processing unit (CPU), a graphics processing unit (GPU), a digital signal processor (DSP), an image signal processor (ISP), a neural processing unit (NPU), etc., along with input/output interfaces, a hierarchy of memory units and associated interconnection databuses. In certain cases, a tracing hardware may be implemented on the information processing system for diagnostic purposes. The tracing hardware may trace a program flow (i.e., determine an instruction sequence for a software program execution). The tracing hardware may require a large quantity of data transfer overhead resulting in a need for high-speed storage medium and for high-speed data transport.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides reduction of data transfer overhead. Accordingly, an apparatus including a tracing hardware configured to: a) provide a record of a plurality of executed instructions, wherein one of the plurality of executed instructions includes an indirect branch address, and b) generate a plurality of packets based on the plurality of executed instructions; and a decoder coupled to the tracing hardware, wherein the decoder includes a first counter configured to increment or to decrement a counter value based on the plurality of executed instructions, and the decoder is configured to: a) receive the plurality of packets, b) infer the indirect branch address associated with a return from function call, and c) to recover the plurality of executed instructions.

In one example, the decoder is configured to receive an explicit branch address when the counter value is zero. In one example, the plurality of packets is a plurality of compressed packets. In one example, the plurality of packets is a plurality of uncompressed packets.

In one example, the apparatus further includes a processor core, coupled to the tracing hardware, the processor core configured to provide the plurality of executed instructions. In one example, the apparatus further includes a repository coupled to the tracing hardware, the repository configured to store the plurality of packets and to provide the plurality of packets to the decoder. In one example, the apparatus further includes a second counter, the second counter configured to be incremented upon observing a function call and configured to be decremented upon observing the return from function call.

In one example, the function call is one of the plurality of executed instructions. In one example, the return from function call is one of the plurality of executed instructions. In one example, the second counter is a component of the tracing hardware.

Another aspect of the disclosure provides a method including incrementing a function call counter for an executed function call; decrementing the function call counter for an executed return from function call; and inferring the indirect branch address based on a function call counter value and when a cumulative count of received executed atoms indicates a return from function call has been executed. In one example, the inferring the indirect branch address is performed by tracking increments and decrements of the function call counter.

In one example, the method further includes oversaturating the function call counter at a maximum counter value if the function call counter contains the maximum counter value and a subsequent function call is executed. In one example, an executed subsequent function call is indicated by a reception of an executed atom. In one example, the method further includes determining an oversaturation by using the cumulative count of received executed atoms.

In one example, the executed function call is indicated by a reception of an executed atom. In one example, the executed function call is indexed by a memory address location. In one example, the memory address location is the indirect branch address. In one example, the indirect branch address is specified in a processor register not directly accessible by a decoder.

In one example, the method further includes oversaturating the function call counter at a maximum counter value if the function call counter contains the maximum counter value and a subsequent function call is executed. In one example, an executed subsequent function call is indicated by a reception of an executed atom. In one example, the method further includes determining an oversaturation by using the cumulative count of received executed atoms. In one example, the method further includes undersaturating the function call counter at a minimum counter value if the function call counter contains the minimum counter value and a subsequent return from function call is executed.

In one example, the method further includes undersaturating the function call counter at a minimum counter value if the function call counter contains the minimum counter value and a subsequent return from function call is executed. In one example, an executed subsequent return from function call is indicated by a reception of an executed atom. In one example, the method further includes determining an undersaturation by using the cumulative count of received executed atoms.

Another aspect of the disclosure provides an apparatus for reduction of data transfer overhead, the apparatus including means for initializing a function call counter; means for incrementing the function call counter for an executed function call; means for decrementing the function call counter for an executed return from function call; and means for inferring the indirect branch address based on a function call counter value and when a cumulative count of received executed atoms indicates a return from function call has been executed.

In one example, the apparatus further includes means for oversaturating the function call counter at a maximum counter value if the function call counter contains the maximum counter value and a subsequent function call is executed; and means for undersaturating the function call counter at a minimum counter value if the function call counter contains the minimum counter value and a subsequent return from function call is executed.

Another aspect of the disclosure provides a non-transitory computer-readable medium storing computer executable code, operable on a device including at least one processor and at least one memory coupled to the at least one processor, wherein the at least one processor is configured to implement reduction of data transfer overhead, the computer executable code including: instructions for causing a computer to initialize a function call counter; instructions for causing the computer to increment the function call counter for an executed function call; instructions for causing the computer to decrement the function call counter for an executed return from function call; instructions for causing the computer to infer the indirect branch address based on a function call counter value and when a cumulative count of received executed atoms indicates a return from function call has been executed; instructions for causing the computer to oversaturate the function call counter at a maximum counter value if the function call counter contains the maximum counter value and a subsequent function call is executed; and instructions for causing the computer to undersaturate the function call counter at a minimum counter value if the function call counter contains the minimum counter value and a subsequent return from function call is executed.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 3 illustrates a first example of an instruction sequence with a plurality of function calls and a plurality of return from function calls.

FIG. 5 illustrates a second example of an instruction sequence with a plurality of function calls and a plurality of return from function calls.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

An information processing system, for example, a computing system with multiple slices (e.g., processing engines) or a system on a chip (SoC), may require multiple levels of coordination or synchronization. In one example, a slice may include a processing engine (i.e., a subset of the computing system) as well as associated memory units and other peripheral units. In one example, execution of an application may be decomposed into a plurality of work tasks which are executed by multiple slices or multiple processing engines.

Figure 1:
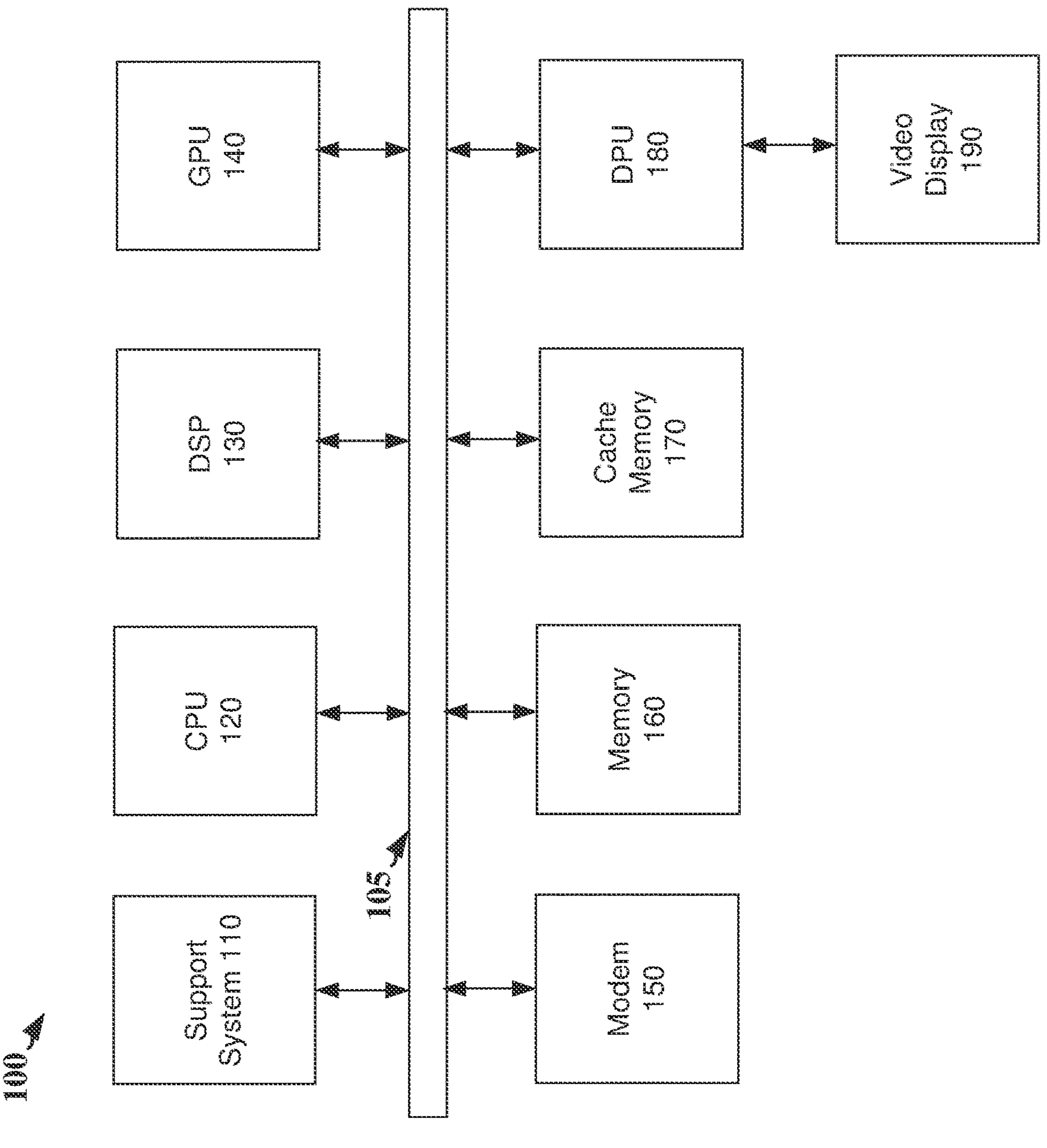
FIG. 1 illustrates an example information processing system.

FIG. 1 illustrates an example information processing system 100. In one example, the information processing system 100 includes a plurality of processing engines such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information.

For example, the memory 160 and/or the cache memory 170 may be shared among the CPU 120, the GPU 140 and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory (i.e., a dedicated memory) which is not shared with the other processing engines. Although several components of the information processing system 100 are included herein, one skilled in the art would understand that the components listed herein are examples and are not exclusive. Thus, other components may be included as part of the information processing system 100 within the spirit and scope of the present disclosure.

In certain cases, a tracing hardware may execute on the information processing system for diagnostic purposes. The tracing hardware may require a large quantity of data transfer overhead while tracing a program flow (i.e., determining an instruction sequence for a program execution). In one example, data transfer overhead refers to auxiliary information which is transported along with desired information. In one example, the present disclosure discloses a tracing hardware which reduces data transfer overhead. For example, data transfer overhead reduction results in less stringent demands on information processing system resources such as storage media and high-speed data transport infrastructure.

In one example, the tracing hardware may be embedded. That is, the tracing hardware may be integrated with hardware resources of the information processing system. In one example, an embedded tracing hardware enables real-time visibility into an execution flow of a program. For example, the execution flow may be a sequence of instructions executed by a processor in the information processing system.

In one example, the tracing hardware may be used to capture detailed information on an execution flow of a program. In one example, the tracing hardware provides a record (e.g., a copy) of an executed instruction stream. In one example, the record of the executed instruction stream enables visibility of run time behavior to the program. For example, the tracing hardware may be used for diagnostic evaluation of the program. The tracing hardware may be operated in real time (i.e., without perceptible time delay). In one example, the tracing hardware may capture messages emitted by the program and record both data flow and execution flow of the program.

In one example, the tracing hardware may employ compression and packetization to manage a large quantity of information in the record of the executed instruction stream. For example, compression may provide a more compact digital representation of information. For example, the more compact digital representation of information may minimize redundant information to approach a lower bound informational entropy representation of the information.

In one example, packetization provides a decomposition of information into a plurality of smaller data units (i.e., packets). That is, the record of the executed instruction stream may be decomposed into a plurality of packets. In one example, the record of the executed instruction stream may be decomposed into a plurality of compressed packets (i.e., packets which contain compressed data). In one example, the record of the executed instruction stream may be decomposed into a plurality of uncompressed packets.

In one example, the tracing hardware may deposit the packets or compressed packets into a repository. In one example, the repository may be a local buffer memory (e.g., an on-chip embedded trace buffer). In one example, the repository may be an external storage element (e.g., an off-chip memory).

Figure 2:
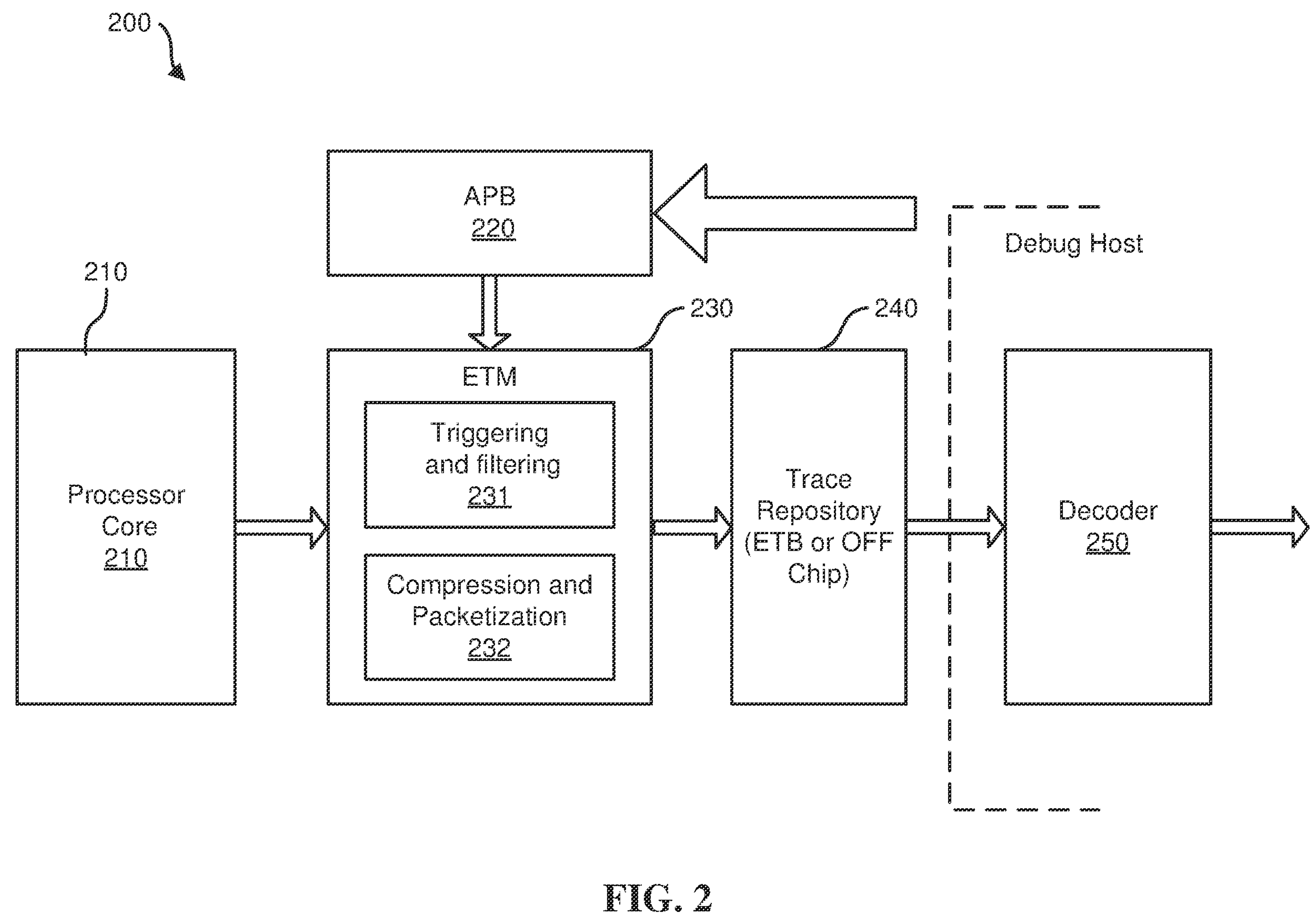
FIG. 2 illustrates a first example of a tracing hardware implementation.

FIG. 2 illustrates a first example of a tracing hardware implementation 200. In one example, a processor core 210 executes a program. In one example, the processor core 210 provides an executed instruction stream. In one example, a tracing hardware 230 (e.g., embedded tracing macro (ETM)) accepts the executed instruction stream and provides a record of the executed instruction stream. For example, the tracing hardware 230 may execute a triggering and filtering module 231 to generate a trigger for certain detected events in the record of the executed instruction stream and to filter the record of the executed instruction stream according to a priori criteria.

For example, the tracing hardware 230 may execute a compression and packetization module 232 to generate uncompressed packets or compressed packets which decompose the record of the executed instruction stream into a plurality of packets which are uncompressed or compressed (i.e., compacted for more efficient storage). In one example, the tracing hardware 230 may receive data from a peripheral databus 220 (e.g., advanced peripheral bus (APB)).

In one example, the tracing hardware 230 deposits the uncompressed packets or compressed packets into a repository 240 (a.k.a., trace repository). In one example, the repository 240 is a local buffer memory. In one example, the repository 240 is an external storage element. In one example, a decoder 250 receives the compressed packets from the repository 240 to recover the record of the executed instruction stream by performing decompression on the compressed packets. In one example, a decoder is referred to as a decoder.

In one example, if the executed instruction stream includes a conditional direct branch instruction from a known starting point, the execution flow may be recovered by determining if a branch was taken (e.g., E atom) or not taken (e.g., N atom). In one example, the E atom indicates that the branch was executed. In one example, the N atom indicates that the branch was not executed.

In one example, an executed function call is indicated by reception of an executed atom (i.e., E atom). In one example, the executed atom (i.e., E atom) is a bilevel state variable which indicates that an indirect branch instruction has been executed.

In one example, a non-executed function call is indicated by reception of a non-executed atom (i.e., N atom). In one example, the non-executed atom (i.e., N atom) is a bilevel state variable which indicates that an indirect branch instruction has not been executed.

In one example, if the executed instruction stream includes an indirect branch instruction with an indirect branch address, the indirect branch address may have an unknown value. In one example, an indirect branch instruction specifies a register where the indirect branch address is located. In one example, the indirect branch address may be stored in an indirect branch address register. For example, a register may be a temporary storage location where data and parameters used by an instruction may be held. For example, the indirect branch address register may be a temporary storage location where the indirect branch address may be held. In one example, an indirect branch refers to a branch instruction which branches to an address contained in a register. In one example, an implicit branch refers to a branch instruction where the decoder is expected to know a target of the branch instruction. In one example, a direct branch refers to a branch instruction which can derive the branch address implicitly. In one example, an explicit branch refers to a branch instruction where the decoder cannot derive the target of the branch instruction and is explicitly given the branch address.

In one example, the indirect branch address must be inserted into the record of the executed instruction stream so that the decoder 250 has access to the indirect branch address. In one example, the insertion of the indirect branch address into the record of the executed instruction stream increases the data transfer overhead into the decoder 250. For example, an indirect branch instruction of the form "jumpr R0" may indicate a relative jump instruction with the indirect branch address determined by the value of indirect branch instruction register R0 in the "jumpr R0" instruction.

In one example, if the executed instruction stream includes a specific type of indirect branch instruction associated with a return from function call, the indirect branch address may be inferred by the decoder 250 if the function call is observed by the decoder 250. In one example, a return from function call is an executed instruction sequence where a call instruction to a function (e.g., function "foo") is followed by an indirect branch instruction (e.g., jumpr R31).

In one example, a program code with a return from function call is shown below:

```
bar:
0x100: call 0x200/foo
0x104: nop
foo:
0x200 jumpr R31//0x104 can be derived
```

In one example, the hexadecimal notation "0xcba" refers to a hexadecimal number cba (i.e., base 16 representation) where "a" represents a multiple of $16^0=1$, "b" represents a multiple of $16^1=16$ and "c" represents a multiple of $16^2=256$. In one example, "0x" is a prefix which indicates a hexadecimal number which follows the prefix. In one example, the usage of hexadecimal notation in the program code specifies a memory location for instructions.

In one example, the program code with a return from function call has a code segment "bar" which includes a call to function "foo" with address 0x200. In one example, the function "foo" has a single instruction "jumpr R31" at address 0x200 which is a return from function call. In one example, if the decoder 250 observes the call to function "foo" at address 0x100, it may infer the address held in the indirect branch instruction register R31 without having access to the indirect branch instruction register R31 in the processor core 210.

In one example, the tracing hardware implementation 200 may infer the address held in the indirect branch instruction register by usage of a plurality of function call counters. In one example, a first function call counter may be part of the tracing hardware 230 and a second function call counter may be part of the decoder 250. In one example, the first function call counter and the second function call counter do not have direct coupling to each other. That is, performing an increment or decrement on the first function call counter is independent of performing an increment or decrement on the second function call counter.

In one example, the first function call counter and the second function call counter each have B bits of dynamic range. In one example, dynamic range refers to a difference between a maximum value and a minimum value. In one example, the B bits of dynamic range have a maximum counter value of $2^B$-1 and a minimum counter value of zero.

In one example, if the first function call counter or the second function call counter holds the maximum counter value of $2^B$-1 and an increment is attempted, the first function call counter or the second function call counter is maintained at the maximum counter value of $2^B$-1 and is not incremented. That is, the first function call counter or the second function call counter is oversaturated in this scenario.

In one example, if the first function call counter or the second function call counter holds the minimum counter value of zero and a decrement is attempted, the first function call counter or the second function call counter is maintained at the minimum counter value of zero and is not decremented. That is, the first function call counter or the second function call counter is undersaturated in this scenario.

In one example, the tracing hardware implementation 200 may infer the address held in the indirect branch instruction register using knowledge of the memory structure of the core processor 210. In one example, the memory structure of the core processor 210 includes memory words with a fixed word size. In one example, the fixed word size is N bytes. For example, the fixed word size is 4 bytes (i.e., 32 bits).

In one example, if the fixed word size is N bytes, a virtual address (VA) of each memory word may increment N hexadecimal units for adjacent memory words. For example, in the program with a return from function call described above, with a fixed word size of 4 bytes, adjacent memory words have virtual addresses of 0x 100 and 0x104.

In one example, the first function call counter is incremented upon observing a function call. In one example, the first function call counter is decremented upon observing a return from function call.

In one example, the second function call counter is incremented upon observing a function call. In one example, the second function call counter is decremented upon observing a return from the function call. In one example, the second function call counter incrementing and decrementing is independently executed from the first function call counter incrementing and decrementing.

FIG. 3 illustrates a first example of an instruction sequence 300 with a plurality of function calls and a plurality of return from function calls. In one example, the first instruction sequence includes a first column 310 for virtual addresses (VA), a second column 320 for instructions, a third column 330 for counter value "Cnt" (e.g., a 2-bit counter), a fourth column 340 for return type, a fifth column 350 for atom type and a sixth column 360 for indirect branch address.

In one example, virtual addresses (VA) itemized in the first column 310 are specified in hexadecimal notation "0xcba", for example, 0x100, 0x200, 0x300, etc.

In one example, a first instruction 321 "call foo" with a first VA 311 of "0x100" is a first function call and a first counter value 331 is incremented from zero to one. In one example, a first atom type 351 associated with the first instruction 321 is set to an executed atom.

In one example, a second instruction 322 "call bar" with a second VA 312 of "0x200" is a second function call and a second counter value 332 is incremented from one to two. In one example, a second atom type 352 associated with the second instruction 322 is set to an executed atom (i.e., E atom).

In one example, a third instruction 323 "call foobar" with a third VA 313 of "0x300" is a third function call and a third counter value 333 is incremented from two to three. In one example, a third atom type 353 associated with the third instruction 323 is set to an executed atom (i.e., E atom).

In one example, a fourth instruction 324 "jumpr R31" is a first return from a function call and a fourth counter value 334 is decremented from three to two. In one example, a fourth atom type 354 associated with the fourth instruction 324 is set to an executed atom (i.e., E atom).

In one example, a fifth instruction 325 "jumpr R31" is a second return from a function call and a fifth counter value 335 is decremented from two to one. In one example, a fifth atom type 355 associated with the fifth instruction 325 is set to an executed atom (i.e., E atom).

In one example, a sixth instruction 326 "jumpr R31" is a third return from a function call and a sixth counter value 336 is decremented from one to zero. In one example, a sixth atom type 356 associated with the sixth instruction 326 is set to an executed atom (i.e., E atom).

In one example, for the first return from a function call (i.e., for the fourth instruction 324 "jumpr R31"), the decoder may infer a fourth indirect branch address 364 after observation of the third function call (i.e., of the third instruction 323 "call foobar"). In one example, the fourth indirect branch address 364 of "0x304 may be inferred from the third VA 313 of "0x300" of the third instruction 323. In one example, the fourth instruction 324 has a return type 344 of "implicit". That is, the decoder may implicitly recover the address of the fourth instruction 324.

In one example, for the second return from a function call (i.e., for the fifth instruction 325 "jumpr R31"), the decoder may infer a fifth indirect branch address 365 after observation of the second function call (i.e., of the second instruction 322 "call bar"). In one example, the fifth indirect branch address 365 of "0x204 may be inferred from the second VA 312 of "0x200" of the second instruction 322. In one example, the fifth instruction 325 has a return type 345 of "implicit".

In one example, for the third return from a function call (i.e., for the sixth instruction 326 "jumpr R31"), the decoder may infer a sixth indirect branch address 366 after observation of the first function call (i.e., of the first instruction 321 "call foo"). In one example, the sixth indirect branch address 366 of "0x104 may be inferred from the first VA 311 of "0x100" of the first instruction 321. In one example, the sixth instruction 326 has a return type 346 of "implicit".

In one example, the tracing hardware implementation 200 may infer the indirect branch address held in the indirect branch instruction register using knowledge of the memory structure of the processor core 210. That is, the fourth indirect branch address 364 of "0x304 may be inferred from the third VA 313 of "0x300" of the third instruction 323 using knowledge of the memory structure with knowledge of the fixed word size of 4 bytes. For example, in this case, 0x300+0x004=0x304 (in hexadecimal notation).

In one example, the first indirect branch address 361, the second indirect branch address 362 and the third indirect branch address 363 are null values since their respective instructions, first instruction 321, second instruction 322 and third instruction 323, do not specify an indirect branch address (i.e., not applicable for these instructions).

Figure 4:
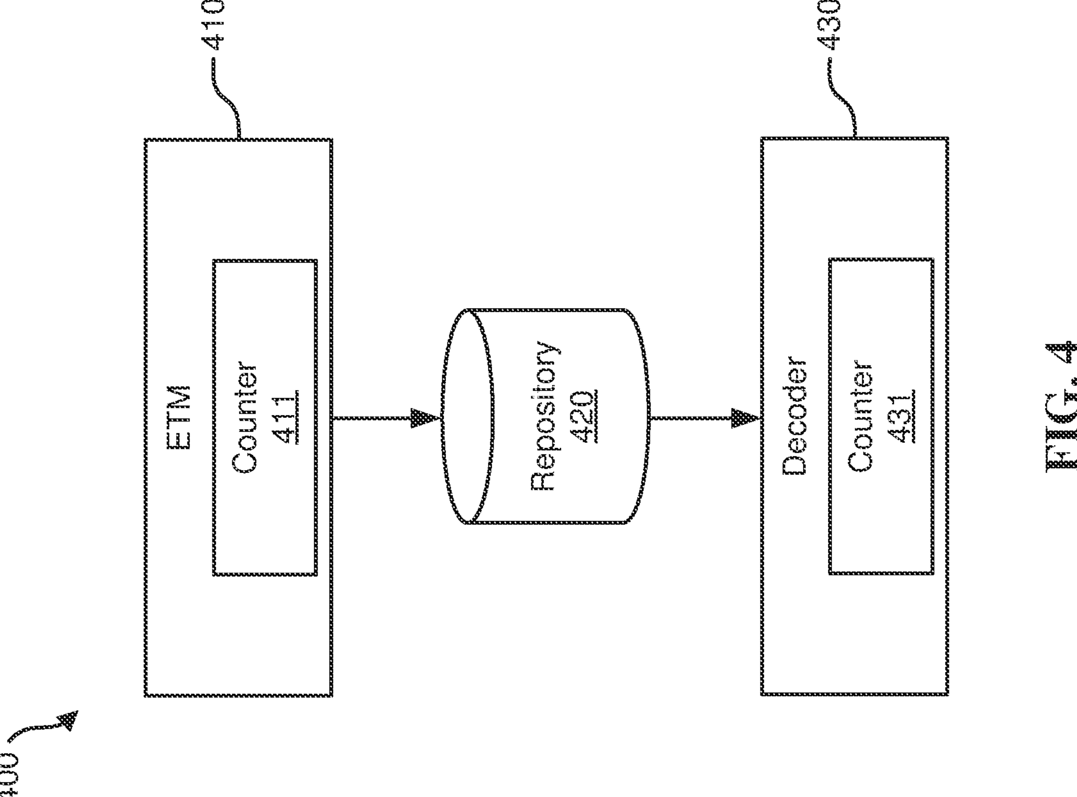
FIG. 4 illustrates a second example of a tracing hardware implementation.

FIG. 4 illustrates a second example of a tracing hardware implementation 400. In one example, a tracing hardware 410 (e.g., embedded tracing macro (ETM)) includes a first function call counter 411. In one example, a repository 420 stores uncompressed packets or compressed packets from the tracing hardware 410. For example, the uncompressed packets or compressed packets are a decomposition of a record of an executed instruction stream in a processor core connected to the tracing hardware 410. In one example, a decoder 430 includes a second function call counter 431. In one example, the decoder 430 accepts the uncompressed packets or the compressed packets from the repository 420 and recovers the record of the executed instruction stream.

In one example, the first function call counter 411 is incremented upon observing a function call. In one example, the first function call counter 411 is decremented upon observing a return from function call. In one example, the second function call counter 431 is incremented upon observing a function call. In one example, the second function call counter 431 is decremented upon observing a return from function call. In one example, the second function call counter 431 incrementing and decrementing is independently executed from the first function call counter 411 incrementing and decrementing.

FIG. 5 illustrates a second example of an instruction sequence 500 with a plurality of function calls and a plurality of return from function calls. In one example, the second instruction sequence includes a first column 510 for virtual addresses (VA), a second column 520 for instructions, a third column 530 for counter value (Cn) t (e.g., a 2-bit counter), a fourth column 540 for return type, a fifth column 550 for atom type and a sixth column 560 for indirect branch address.

In one example, virtual addresses (VA) itemized in the first column 510 are specified in hexadecimal notation "0xcba", for example, 0x100, 0x200, 0x300, 0x400, 0x500, etc.

In one example, a first instruction 521 "call foo" with first VA 511 of "0x100" is a first function call, and a first counter value 531 is incremented from zero to one. In one example, the first VA 511 of "0x100" has a first subsequent VA 569*a* of "0x104". In one example, a first atom type 551 associated with the first instruction 521 is set to an executed atom (i.e., E atom).

In one example, a second instruction 522 "call bar" with second VA 512 of "0x200" is a second function call, and a second counter value 532 is incremented from one to two. In one example, the second VA 512 of "0x200" has a second subsequent VA 569 of "0x204". In one example, a second atom type 552 associated with the second instruction 522 is set to executed atom (i.e., E atom).

In one example, a third instruction 523 "call foobar" with third VA 513 of "0x300" is a third function call, and a third counter value 533 is incremented from two to three. In one example, the third VA 513 of "0x300" has a third subsequent VA 568 of "0x304". In one example, a third atom type 553 associated with the third instruction 523 is set to executed atom (i.e., E atom).

In one example, a fourth instruction 524 "call foofoobar" with fourth VA 514 of "0x400" is a fourth function call, and a fourth counter value 534 is oversaturated at three and not incremented beyond three. In one example, the fourth VA 514 of "0x400" has a fourth subsequent VA 567 of "0x404". In one example, a fourth atom type 554 associated with the fourth instruction 524 is set to executed atom (i.e., E atom).

In one example, a fifth instruction 525 "call foofoofoobar" with fifth VA 515 of "0x500" is a fifth function call, and a fifth counter value 535 is oversaturated at three and not incremented beyond three. In one example, the fifth VA 515 of "0x500" has a fifth subsequent VA 566 of "0x504". In one example, a fifth atom type 555 associated with the fifth instruction 525 is set to executed atom (i.e., E atom).

In one example, a sixth instruction 526 "jumpr R31" is a first return from function call, and a sixth counter value 536 is decremented from three to two. In one example, a sixth atom type 556 associated with the sixth instruction 526 is set to executed atom (i.e., E atom).

In one example, a seventh instruction 527 "jumpr R31" is a second return from function call, and a seventh counter value 537 is decremented from two to one. In one example, a seventh atom type 557 associated with the seventh instruction 527 is set to executed atom (i.e., E atom).

In one example, an eighth instruction 528 "jumpr R31" is a third return from function call, and an eighth counter value 538 is decremented from one to zero. In one example, an eighth atom type 558 associated with the eighth instruction 528 is set to executed atom (i.e., E atom).

In one example, a ninth instruction 529 "jumpr R31" is a fourth return from function call, and a ninth counter value 539 is undersaturated at zero and not decremented beyond zero. In one example, a ninth atom type 559 associated with the ninth instruction 529 is set to executed atom (i.e., E atom).

In one example, a tenth instruction 529*a* "jumpr R31" is a fifth return from function call, and a tenth counter value 539*a* is undersaturated at zero and not decremented beyond zero. In one example, a tenth atom type 559*a* associated with the tenth instruction 529*a* is set to executed atom (i.e., E atom).

In one example, for the first return from function call (i.e., for the sixth instruction 526 "jumpr R31"), the decoder may infer a fifth indirect branch address 566 after observation of the fifth function call (i.e., of the fifth instruction 525 "call foofoofoobar"). In one example, the fifth indirect branch address 566 of "0x504 may be inferred from the fifth VA 515 of "0x500" of the fifth instruction 525. In one example, the sixth instruction 526 has a return type 546 of "implicit".

In one example, for the second return from function call (i.e., for the seventh instruction 527 "jumpr R31"), the decoder may infer a fourth indirect branch address 567 after observation of the fourth function call (i.e., of the fourth instruction 524 "call foofoobar"). In one example, the fourth indirect branch address 567 of "0x404 may be inferred from the fourth VA 514 of "0x400" of the fourth instruction 524. In one example, the seventh instruction 527 has a return type 547 of "implicit".

In one example, for the third return from function call (i.e., for the eighth instruction 528 "jumpr R31"), the decoder may infer a third indirect branch address 568 after observation of the third function call (i.e., of the third instruction 523 "call foobar"). In one example, the third indirect branch address 568 of "0x304 may be inferred from the third VA 513 of "0x300" of the third instruction 523. In one example, the eighth instruction 528 has a return type 548 of "implicit".

In one example, for the fourth return from function call (i.e., for the ninth instruction 529 "jumpr R31"), the decoder may infer a second indirect branch address 569 after observation of the second function call (i.e., of the second instruction 522 "call bar"). In one example, the second indirect branch address 569 of "0x204 may be inferred from the second VA 512 of "0x200" of the second instruction 522. In one example, the ninth instruction 529 has a return type 549 of "explicit".

In one example, for the fifth return from function call (i.e., for the tenth instruction 529*a* "jumpr R31"), the decoder may infer a first indirect branch address 569*a* after observation of the first function call (i.e., of the first instruction 521 "call foo"). In one example, the first indirect branch address 569*a* of "0x104 may be inferred from the first VA 511 of "0x100" of the first instruction 521. In one example, the tenth instruction 529*a* has a return type 549*a* of "explicit".

In one example, the counter value (Cnt) of the third column 530 of FIG. 5 is a 2-bit counter. In one example, the counter value (Cnt) has four discrete values: zero, one, two and three. In one example, if the counter value (Cnt) is equal to three, it is not incremented beyond three and is oversaturated at its maximum value of three. In one example, if the counter value (Cnt) is equal to zero, it is not decremented below zero and is undersaturated at its minimum value of zero.

In one example, if the counter value (Cnt) is greater than zero, a cumulative count of executed atoms (i.e., E atoms) after a first number of executed instructions indicates a cumulative quantity of executed function calls and executed return to function calls. In one example, atoms are associated with a committing of a packet (e.g., group of instructions). In one example, there are two types of atoms. A first type of atom is an E atom which indicates that a packet was committed and is also used to indicate the next packet. For example, an E atom indicates that either a conditional branch in the packet was executed (e.g., if one is present) or the next sequential packet is next. A second type of atom is an N atom which applies only when a packet contains a conditional branch and the branch was not taken. In one example, the counter value increments when an atom appears for a packet with a call instruction, which will always be an E atom.

In one example, if the counter value (Cnt) is equal to zero, the cumulative count of executed atoms (i.e., E atoms) after a second number of executed instructions indicates an updated cumulative quantity of executed function calls and executed return to function calls.

In one example, the counter value (Cnt) of the third column 530 of FIG. 5 is incremented on a function call and is decremented on a return from function call.

In one example, for an indirect branch instruction which is executed, if the counter value (Cnt) is greater than zero, the tracing hardware sets the atom type to "E atom" to indicate that the indirect branch is taken. Next, the tracing hardware decrements the counter value (Cnt). In one example, the indirect branch instruction is a special type of indirect branch instruction (e.g., "jumpr R31") which is used for a return from function call. In one example, for every instance of a return from function call, the counter is decremented until the counter value reaches zero. In one example, if the counter value is non-zero, the decoder should have seen the function call before the corresponding return from function call.

In one example, for a direct branch instruction which is executed, if the counter value (Cnt) is equal to zero, the tracing hardware associates a branch address (BA) with an "E atom". In one example, an indirect branch instruction associated with the return from function call is executed. For example, if the counter value is equal to zero, the tracing hardware sends out an explicit branch address (BA) and an associated E atom.

In one example, certain program flows may have an asymmetry between a function call and a return from function call. In one example, asymmetric program flows cannot infer the indirect branch address held in the indirect branch instruction register. Examples of asymmetric program flows may include a context switch (e.g., swapping from one task or thread to another task or thread), adaptive synchronization overflows, and/or certain software manipulations of the return from function call (e.g., not returning with jump instruction jump R31, modification of a return tree, etc.).

Figure 6:
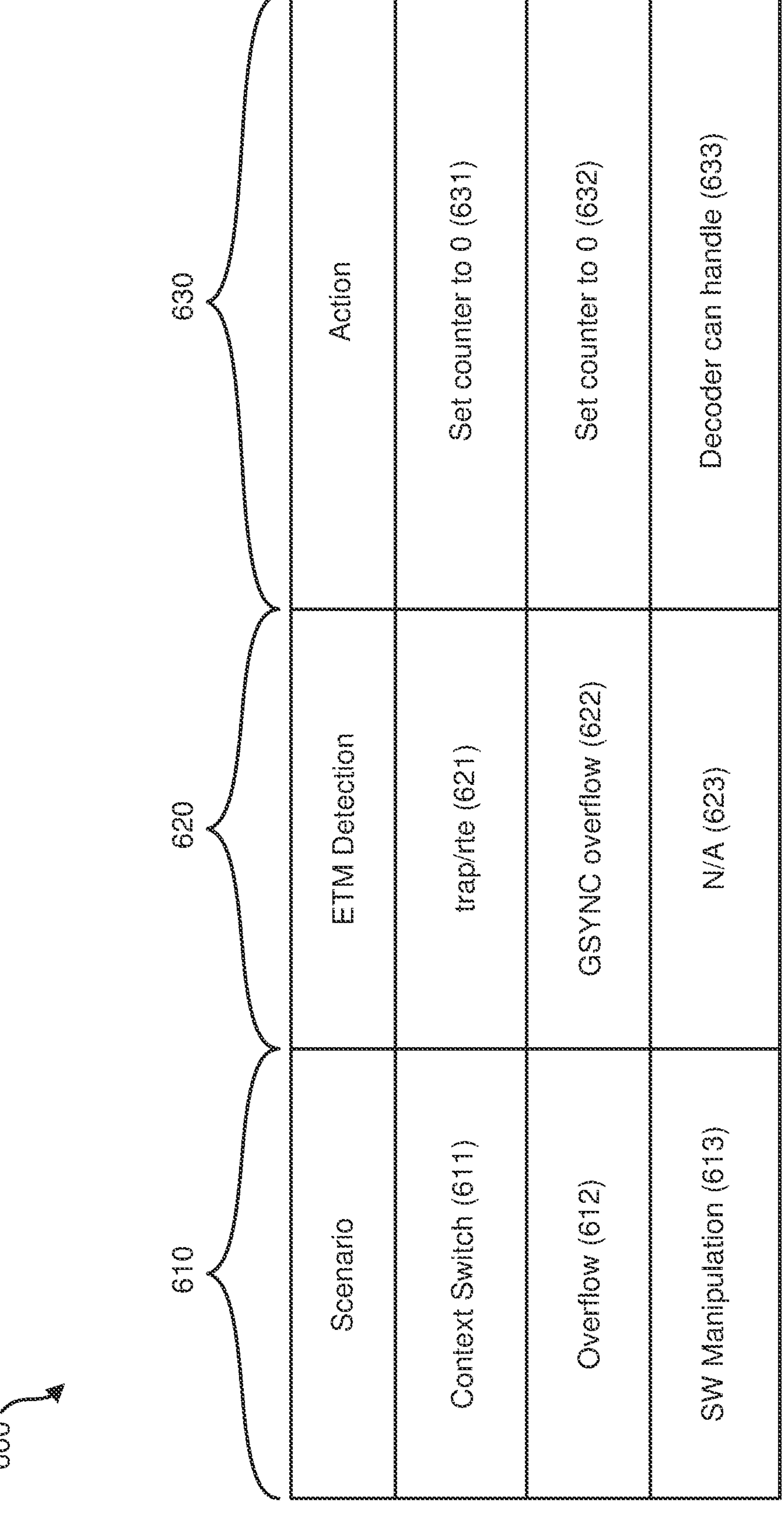
FIG. 6 illustrates an example asymmetric program flows.

FIG. 6 illustrates an example asymmetric program flows 600. In one example, a first column 610 lists example asymmetric program flow scenarios, a second column 620 lists detection methods by a tracing hardware and a third column 630 lists actions taken by the tracing hardware for each scenario.

For example, a context switch 611 (e.g., a swapping of processor state from a first task or thread to a second task or thread) may be detected by a software trap or a return from exception (rte) 621. For example, the context switch 611 may result in an action to set a counter to zero 631. In one example, the return from exception (rte) indicates that a non-traceable flow has occurred. For example, the processor has taken an exception, trapped into a kernel and returns to a potentially different memory location where the exception occurred.

For example, an adaptive synchronization overflow 612 may be detected by an explicit synchronization overflow flag 622. For example, the adaptive synchronization overflow 612 may result in an action to set the counter to zero 632.

For example, a software (SW) manipulation 613 may not be detected (N/A) 623. For example, the software (SW) manipulation 613 may result in an action where the decoder handles the software manipulation 633.

Figure 7:
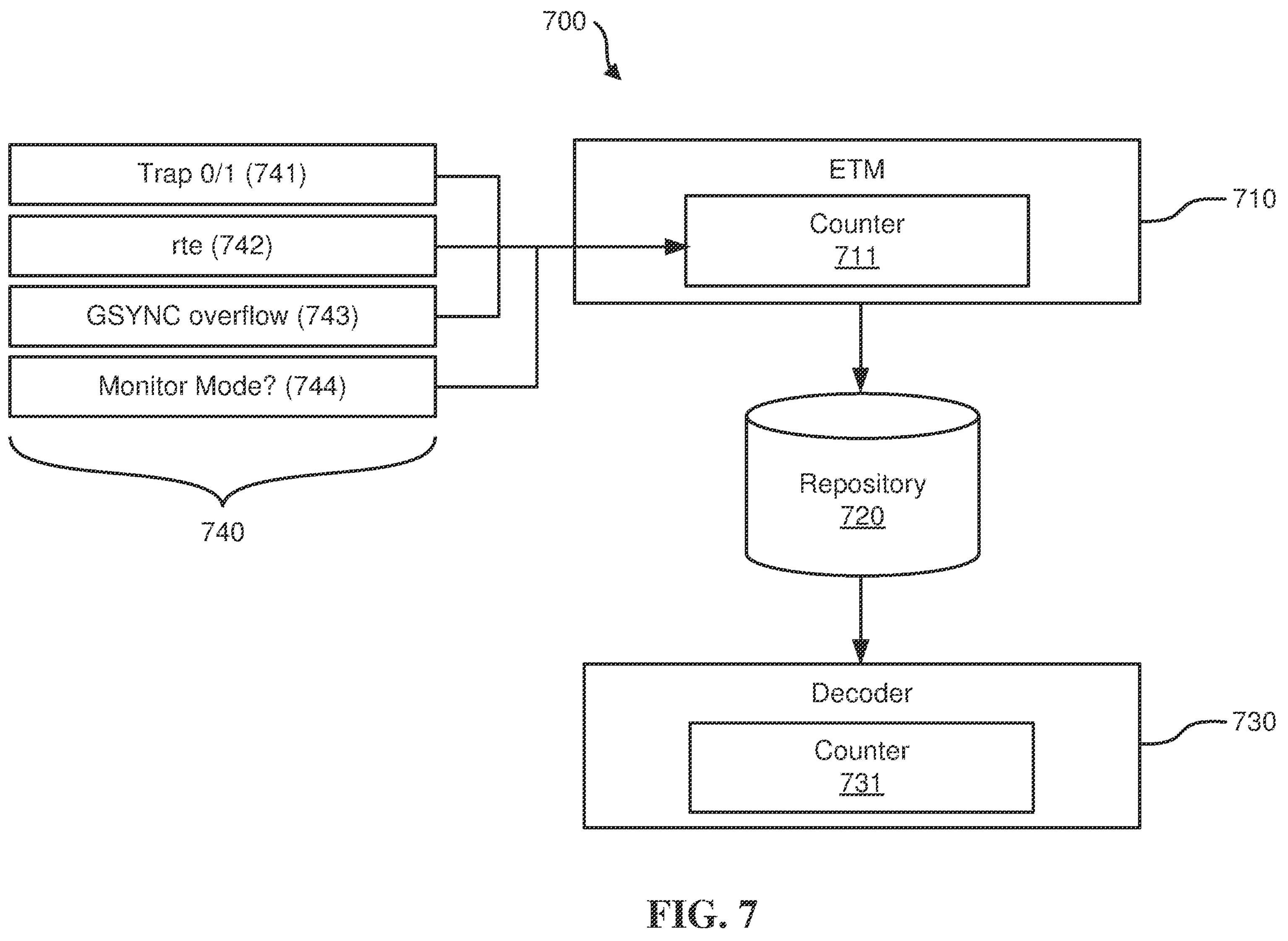
FIG. 7 illustrates a third example tracing hardware implementation.

FIG. 7 illustrates a third example tracing hardware implementation 700. In one example, a tracing hardware 710 (e.g., embedded tracing macro, ETM) includes a first function call counter 711. In one example, a repository 720 stores uncompressed packets or compressed packets from the tracing hardware 710. In one example, the uncompressed packets or compressed packets are a decomposition of a record of an executed instruction stream in a processor core connected to the tracing hardware 710. In one example, a decoder 730 includes a second function call counter 731. In one example, the decoder 730 accepts the uncompressed packets or compressed packets from the repository 720 and recovers the record of the executed instruction stream.

In one example, a plurality of program flows 740 are examined by the tracing hardware 710. For example, the plurality of program flows 740 include a software trap 741, a rte 742, an adaptive synchronization overflow 743, and a monitor mode query 744. In one example, the plurality of program flows may be asymmetric program flows. In one example, the asymmetric program flows cannot infer an indirect branch address held in an indirect branch instruction register.

In one example, a tracing hardware with function call counters may reduce information processing system needs for a high-speed storage medium and for high-speed data transport. In one example, the tracing hardware with function call counters may reduce its data bandwidth demands significantly by eliminating a need to send a return address explicitly between the tracing hardware and a separate decoder. In one example, the decoder is used to recover a record of an executed instruction stream from a processor core connected to the tracing hardware.

Figure 8:
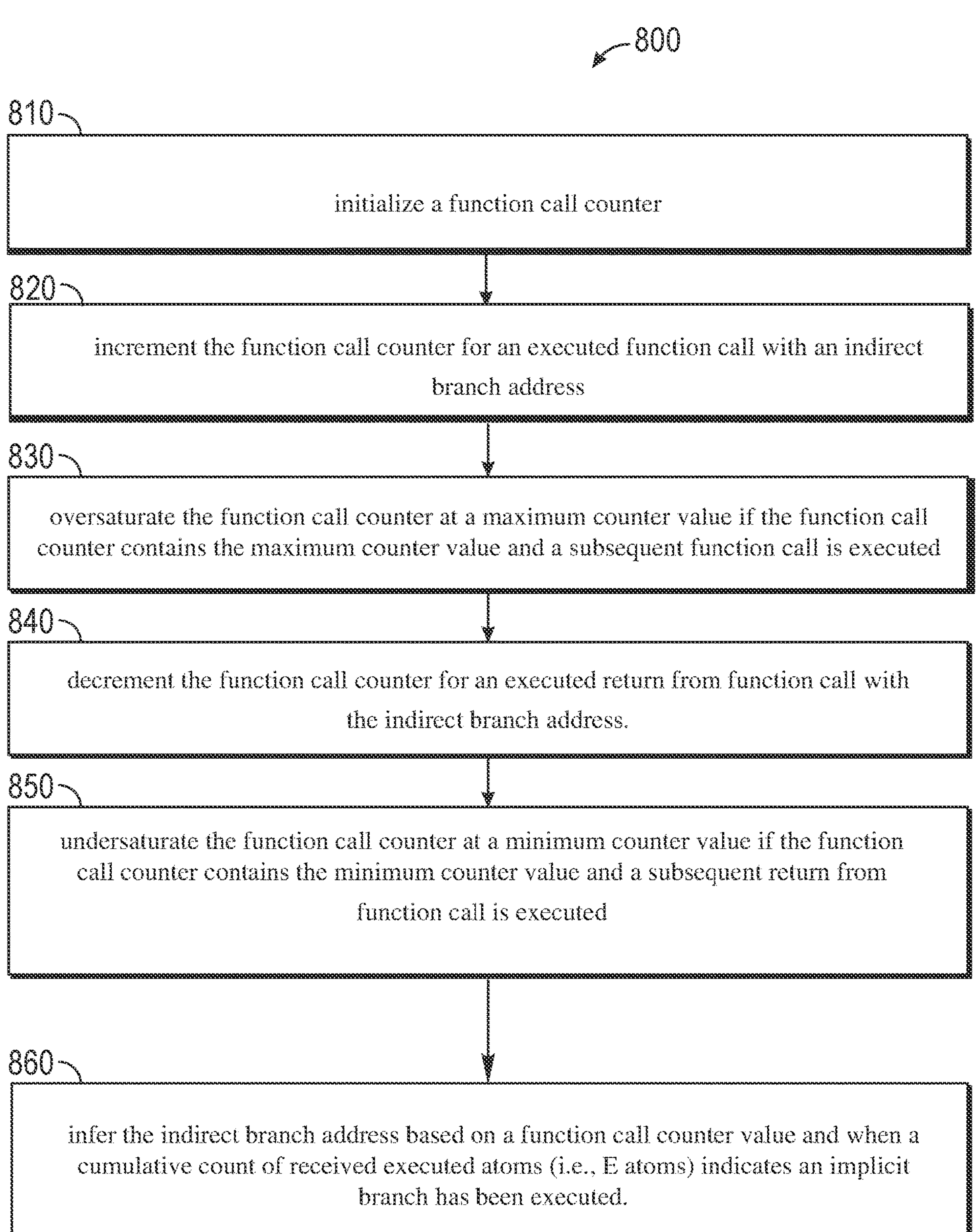
FIG. 8 illustrates an example flow diagram for program flow tracing with function call counters.

FIG. 8 illustrates an example flow diagram 800 for program flow tracing with function call counters. In block 810, initialize a function call counter. That is, a function call counter is initialized. In one example, the initialization is performed in a decoder. In one example, the initialization of the function call counter sets the counter to zero.

In block 820, increment the function call counter for an executed function call. That is, the function call counter is incremented for an executed function call. In one example, the function call counter is incremented for every executed function call. In one example, the executed function call is indicated by reception of an executed atom (i.e., E atom). In one example, the executed atom (i.e., E atom) is a bilevel state variable which indicates whether or not a conditional branch in a packet has been executed. In one example, a function call is a program instruction which invokes a function to perform a certain action. In one example, the executed function call may be indexed (i.e., labeled) by a memory address location. In one example, the memory address location may be represented in hexadecimal notation "0xcba". In one example, the memory address location may be an indirect branch address. In one example, the indirect branch address may be specified in a processor register not directly accessible by the decoder.

In block 830, oversaturate the function call counter at a maximum counter value if the function call counter contains the maximum counter value and a subsequent function call is executed. That is, the function call counter is oversaturated at a maximum counter value if the function call counter contains the maximum counter value and a subsequent function call is executed. In one example, the executed subsequent function call is indicated by reception of another executed atom (i.e., E atom). In one example, a cumulative count of received executed atoms (i.e., E atom) may be used to determine the oversaturation. In one example, oversaturate means to maintain the function call counter at the maximum counter value if a subsequent function call is executed. In one example, the function call counter has B bits of dynamic range with the maximum counter value of $2^B$-1.

In block 840, decrement the function call counter for an executed return from function call with the indirect branch address. That is, the function call counter is decremented for an executed return from function call with the indirect branch address. In one example, the function call counter is decremented for every executed return from function call with the indirect branch address. In one example, the executed return from function call is indicated by reception of an executed atom (i.e., E atom). In one example, the executed atom (i.e., E atom) is a bilevel state variable which indicates whether or not an indirect branch instruction has been executed. In one example, the indirect branch address is specified in the processor register not directly accessible by the decoder.

In block 850, undersaturate the function call counter at a minimum counter value if the function call counter contains the minimum counter value and a subsequent return from function call is executed. That is, the function call counter is undersaturated at a minimum counter value if the function call counter contains the minimum counter value and a subsequent return from function call is executed. In one example, the executed subsequent return from function call is indicated by reception of another executed atom (i.e., E atom). In one example, a cumulative count of received executed atoms (i.e., E atoms) may be used to determine the undersaturation. In one example, undersaturate means to maintain the function call counter at the minimum counter value if a subsequent function call is executed. In one example, the function call counter has B bits of dynamic range with the minimum counter value of zero.

In block 860, infer the indirect branch address based on a value of the function call counter (a.k.a., function call counter value) and when a cumulative count of received executed atoms (i.e., E atoms) indicates a return from function call has been executed. That is, infer the indirect branch address is inferred based on a value of the function call counter (a.k.a., function call counter value) and when a cumulative count of received executed atoms (i.e., E atoms) indicates a return from function call has been executed. In one example, the function call counter value is zero. That is, in one example, the indirect branch address is inferred when the function call counter is equal to zero and when a cumulative count of received executed atoms (i.e., E atoms) indicates a return from function call has been executed.

In one example, the indirect branch address may be inferred by tracking increments and decrements of the function call counter. In one example, when a function is called, the return address is saved. In one example, when the function completes execution, it returns to the next sequential instruction after the call in the previous function. In one example, the return is completed using an indirect branch and its target is referred to the indirect branch address. In one example, an explicit branch address may be encoded in the branch instruction and hence is always directed to the same destination. In one example, implicit returns use an address stored in a register.

In one aspect, one or more of the steps for providing reduction of data transfer overhead in FIG. 8 may be executed by one or more processors which may include hardware, software, firmware, etc. The one or more processors, for example, may be used to execute software or firmware needed to perform the steps in the flow diagram of FIG. 8. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:

a tracing hardware configured to:

a) provide a record of a plurality of executed instructions, wherein one of the plurality of executed instructions includes an indirect branch address, and b) generate a plurality of packets based on the plurality of executed instructions; and a decoder coupled to the tracing hardware, wherein the decoder includes a first counter configured to increment or to decrement a counter value based on the plurality of executed instructions, and the decoder is configured to:

a) receive the plurality of packets, b) infer the indirect branch address associated with a return from function call based on a memory structure and a fixed word size as an address offset corresponding to a previous function call, and c) to recover the plurality of executed instructions.

2. The apparatus of claim 1, wherein the decoder is configured to receive an explicit branch address when the counter value is zero.

3. The apparatus of claim 1, wherein the plurality of packets is a plurality of compressed packets.

4. The apparatus of claim 1, wherein the plurality of packets is a plurality of uncompressed packets.

5. The apparatus of claim 1, further comprising a processor core, coupled to the tracing hardware, the processor core configured to provide the plurality of executed instructions.

6. The apparatus of claim 5, further comprising a repository coupled to the tracing hardware, the repository configured to store the plurality of packets and to provide the plurality of packets to the decoder.

7. The apparatus of claim 6, further comprising a second counter, the second counter configured to be incremented upon observing a function call and configured to be decremented upon observing the return from function call.

8. The apparatus of claim 7, wherein the function call is one of the plurality of executed instructions.

9. The apparatus of claim 7, wherein the return from function call is one of the plurality of executed instructions.

10. The apparatus of claim 7, wherein the second counter is a component of the tracing hardware.

11. A method comprising:

incrementing a function call counter for an executed function call;

decrementing the function call counter for an executed return from function call; and inferring the indirect branch address based on a function call counter value and based on a memory structure and a fixed word size as an address offset corresponding to a previous function call.

12. The method of claim 11, wherein the inferring the indirect branch address is performed by tracking increments and decrements of the function call counter.

13. The method of claim 11, further comprising oversaturating the function call counter at a maximum counter value if the function call counter contains the maximum counter value and a subsequent function call is executed.

14. The method of claim 13, wherein an executed subsequent function call is indicated by a reception of an executed atom.

15. The method of claim 13, further comprising determining an oversaturation by using the cumulative count of received executed atoms.

16. The method of claim 11, wherein the executed function call is indicated by a reception of an executed atom.

17. The method of claim 16, wherein the executed function call is indexed by a memory address location.

18. The method of claim 17, wherein the memory address location is the indirect branch address.

19. The method of claim 18, wherein the indirect branch address is specified in a processor register not directly accessible by a decoder.

20. The method of claim 19, further comprising oversaturating the function call counter at a maximum counter value if the function call counter contains the maximum counter value and a subsequent function call is executed.

21. The method of claim 20, wherein an executed subsequent function call is indicated by a reception of an executed atom.

22. The method of claim 19, further comprising determining an oversaturation by using the cumulative count of received executed atoms.

23. The method of claim 19, further comprising undersaturating the function call counter at a minimum counter value if the function call counter contains the minimum counter value and a subsequent return from function call is executed.

24. The method of claim 11, further comprising undersaturating the function call counter at a minimum counter value if the function call counter contains the minimum counter value and a subsequent return from function call is executed.

25. The method of claim 24, wherein an executed subsequent return from function call is indicated by a reception of an executed atom.

26. The method of claim 25, further comprising determining an undersaturation by using the cumulative count of received executed atoms.

27. An apparatus for reduction of data transfer overhead, the apparatus comprising:

means for initializing a function call counter;

means for incrementing the function call counter for an executed function;

means for decrementing the function call counter for an executed return from function call; and means for inferring the indirect branch address based on a function call counter value and based on a memory structure and a fixed word size as an address offset corresponding to a previous function call.

28. The apparatus of claim 27, further comprising:

means for oversaturating the function call counter at a maximum counter value if the function call counter contains the maximum counter value and a subsequent function call is executed; and means for undersaturating the function call counter at a minimum counter value if the function call counter contains the minimum counter value and a subsequent return from function call is executed.

29. A non-transitory computer-readable medium storing computer executable code, operable on a device comprising at least one processor and at least one memory coupled to the at least one processor, wherein the at least one processor is configured to implement reduction of data transfer overhead, the computer executable code comprising:

instructions for causing a computer to initialize a function call counter;

instructions for causing the computer to increment the function call counter for an executed function call;

instructions for causing the computer to decrement the function call counter for an executed return from function call; and instructions for causing the computer to infer the indirect branch address based on a function call counter value and based on a memory structure and a fixed word size as an address offset corresponding to a previous function call.

30. The non-transitory computer-readable medium of claim 29, further comprising:

instructions for causing the computer to oversaturate the function call counter at a maximum counter value if the function call counter contains the maximum counter value and a subsequent function call is executed; and instructions for causing the computer to undersaturate the function call counter at a minimum counter value if the function call counter contains the minimum counter value and a subsequent return from function call is executed.

* * * * *